(12) United States Patent
Shin et al.

(10) Patent No.: US 6,620,544 B1
(45) Date of Patent: Sep. 16, 2003

(54) SEALED BATTERY

(75) Inventors: Jeong-Soon Shin, Chungchongnam-do (KR); Ki-Woong Jang, Chungchongnam-do (KR); Jae-Hou Nah, Chungchongnam-do (KR); Jin-Kyung Kim, Chungchongnam-do (KR)

(73) Assignee: Samsung SDI Co., Ltd., Kyonggi-Do (KR)

( * ) Notice: Subject to any disclaimer, the term of this patent is extended or adjusted under 35 U.S.C. 154(b) by 44 days.

(21) Appl. No.: 09/619,904

(22) Filed: Jul. 19, 2000

(30) Foreign Application Priority Data

Oct. 27, 1999 (KR) .......................... 1999-46933

(51) Int. Cl.[7] .......................... H01M 2/12; H01M 2/34
(52) U.S. Cl. .......................... 429/56; 429/53; 429/62
(58) Field of Search .......................... 429/53, 56, 61, 429/62, 7, 82

(56) References Cited

U.S. PATENT DOCUMENTS

| | | | | |
|---|---|---|---|---|
| 4,745,039 A | * | 5/1988 | Yoshinaka | 429/54 |
| 4,943,497 A | | 7/1990 | Oishi et al. | 429/53 |
| 5,057,382 A | * | 10/1991 | Tucholski | 429/57 |
| 5,418,082 A | | 5/1995 | Taki | 429/53 |
| 5,702,840 A | * | 12/1997 | Byon | 429/53 |
| 5,747,187 A | * | 5/1998 | Byon | 429/57 |
| 5,853,912 A | | 12/1998 | Naing et al. | 429/61 |
| 6,235,426 B1 | * | 5/2001 | Yanai et al. | 429/178 |
| 6,322,921 B1 | * | 11/2001 | Iwaizono et al. | 429/56 |

FOREIGN PATENT DOCUMENTS

JP 9-274900 10/1997

* cited by examiner

Primary Examiner—Randy Gulakowski
Assistant Examiner—Jonathan Crepeau
(74) Attorney, Agent, or Firm—Norris, McLaughlin & Marcus P.A.

(57) ABSTRACT

A sealed battery includes a can for receiving an electric generator, a sealing member crimped on an opening of the can and connected to one of a positive electrode and a negative electrode of the electric generator, a gasket disposed between the can and the sealing member, a cover cap disposed on the sealing member with an insulating member disposed between the cover cap and the sealing member, a current control member disposed between the cover cap and the sealing member to cut-off a flow of current when a temperature of the battery is increased above an allowable level, and a shock absorber disposed between the cover cap and the current control member to prevent shock from being directly transmitted to the current control member.

9 Claims, 6 Drawing Sheets

SEALED BATTERY

BACKGROUND OF THE INVENTION

1. Field of the Invention

The present invention relates to a sealed battery having a safety feature in which the flow of a current is cut off and an internal pressure is released when a temperature of the battery is increased above an allowable level.

2. Description of the Related Art

A sealed battery can pose serious safety problems when an internal pressure thereof is increased above an allowable level as a result of being overcharged or otherwise abnormally operated. In particular, the sealed battery may explode under such conditions.

To solve the above problem, U.S. Pat. No. 4,943,497 discloses a cylindrical sealed battery having a safety device which is designed to cut-off the flow of a current when an internal pressure is increased above an allowable level.

That is, when the internal pressure of the battery is increased above an allowable level, an explosion-proof valve is deformed by the increased pressure so that an electrode lead welded on a projection of the explosion-proof valve is broken by a stripper, thereby cutting-off the flow of current to enhance the safety of the battery.

U.S. Pat. No. 5,418,082 discloses another sealed battery having means for cutting-off the flow of a current. The current cut-off means disclosed in the patent is designed such that a safety valve is deformed when internal pressure of the battery is increased, and a projection of the safety valve is disconnected from a metal membrane by the deformation of the safety valve, thereby cutting-off the flow of the current.

As additional safety means, each of the safety valves disclosed in the above two patents is provided with a safety groove which is designed to be broken when the internal pressure is increased above a predetermined safety level.

However, since each of the safety valves of the patents is designed to be operated only when the internal pressure is increased. Therefore, the batteries disclosed in the patents are still hazardous in that they may explode when a temperature of the battery is increased above an allowable level.

To solve this problem, a current control member which performs the cutoff of an electric circuit in response to an internal temperature of the battery has been proposed.

However, the current cutoff means, the safety valve, and the current control member complicate a structure of the battery and make necessary various parameters, making it difficult to exactly design the battery.

SUMMARY OF THE INVENTION

Therefore, the present invention has been made in an effort to solve the above described problems.

It is an objective of the present invention to provide a sealed battery having a safety feature which does damage parts of the battery when activated.

It is another objective of the present invention to provide a sealed battery which is simple in structure.

To achieve the above objectives, the present invention provides a sealed battery comprising a can for receiving an electric generator, a sealing member crimped on an opening of the can and connected to one of a positive electrode and a negative electrode of the electric generator, a gasket disposed between the can and the sealing member, a cover cap disposed on the sealing member with an insulating member disposed between the cover cap and the sealing member, a current control member disposed between the cover cap and the sealing member to cut-off a flow of current when a temperature of the battery is increased above an allowable level, and a shock absorber disposed between the cover cap and the current control member to prevent shock from being directly transmitted to the current control member.

The sealing member is designed to be broken when internal pressure of the battery is increased above an allowable level to prevent the explosion of the battery by exhausting an internal gas. The sealing member is provided with a safety groove for providing a mechanically weak portion.

The current control member is designed to be quickly increased in resistance within a temperature of 75–85° C. A thickness of the current control member is less than that of the insulating member.

The insulating member is ring-shaped and the current control member is rectangular and disposed inside the ring-shaped insulating member. Alternatively, the current control member may be ring-shaped and disposed inside the ring-shaped insulating member.

The shock absorber is provided in the form of a metal foam or a metallic elastic member.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiment of the invention, an example of which is illustrated in the accompanying drawing(s). Wherever possible, the same reference numbers will be used throughout the drawings to refer to the same or like parts.

Figure 1:
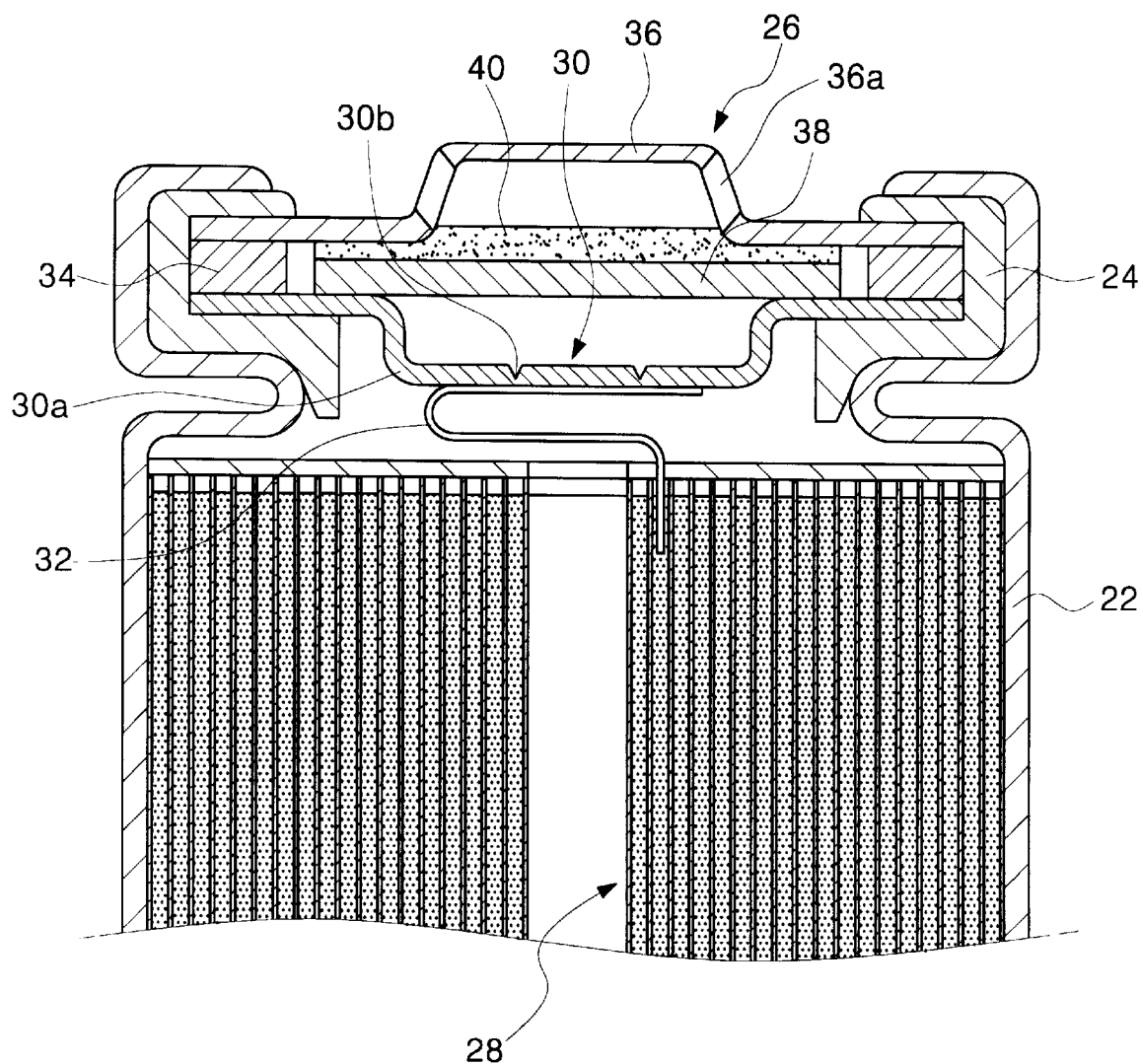
FIG. 1 is a sectional view of a sealed battery according to a first embodiment of the present invention.
Figure 2:
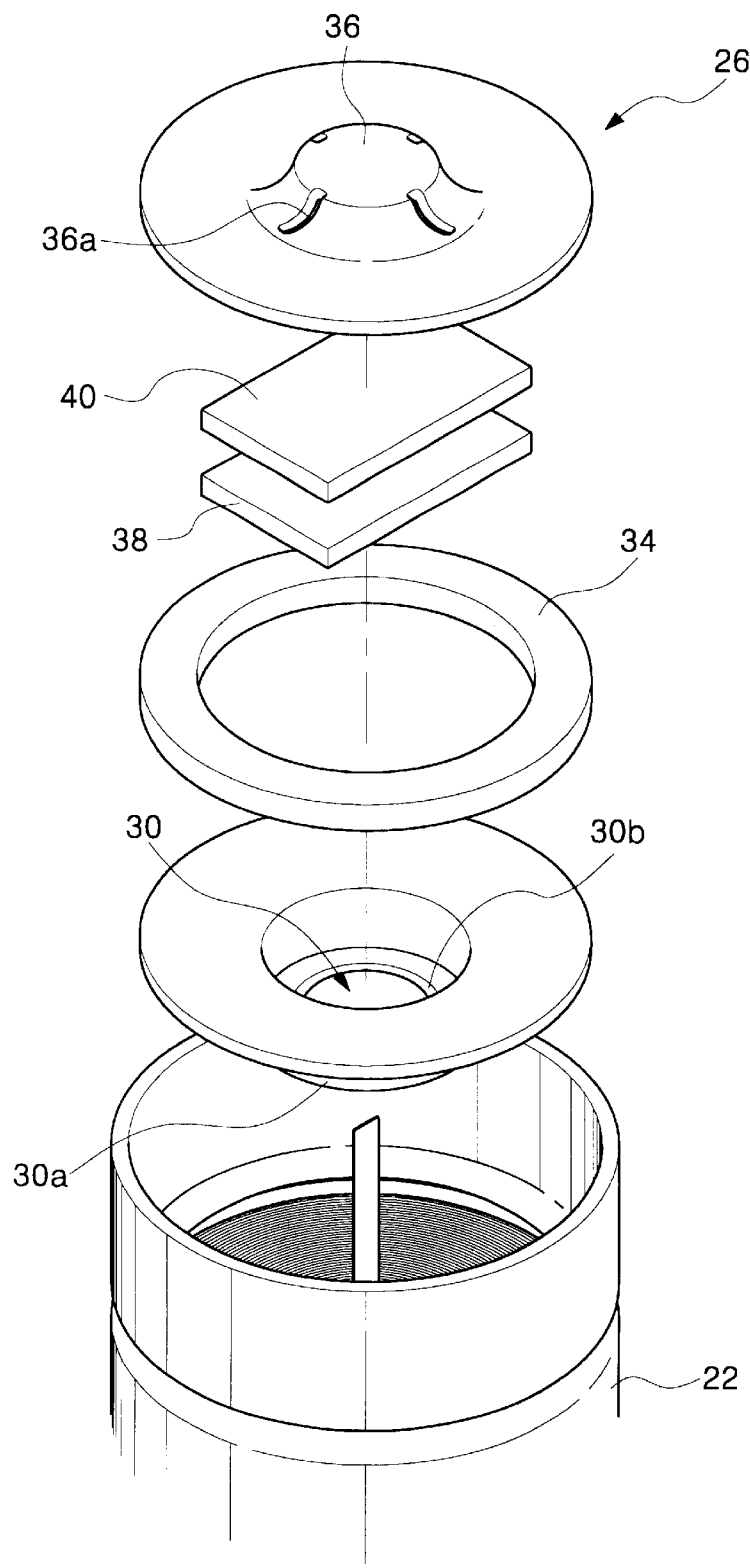
FIG. 2 is an exploded perspective view of a sealed battery according to a first embodiment of the present invention.

FIGS. 1 and 2 show a sealed battery according to a first embodiment of the present invention, wherein a structure of a cap assembly is particularly illustrated in detail.

A sealed battery of this embodiment comprises a can 22 and a cap assembly 26 close-tightly mounted on a top of the can 22 with a gasket interposed therebetween.

An electric generator 28 having a positive electrode, a negative electrode, and a separator disposed between the positive and negative electrode is received within the can 22.

The cap assembly 26 includes a shape-variable plate 30 which functions as a sealing member and is deformed in a direction corresponding to a direction of the application of an internal pressure. A center of the shape-variable plate 30 is indented toward the electric generator 28 such that a projection 30a is formed on the center of the shape-variable plate 30. A bottom of the projection 30a is connected to one of the positive and negative electrodes of the electric generator 28 by a tap 32. The other electrode of the electric generator 28 is directly connected to an inside wall of can 22.

A ring-shaped insulating member 34 is disposed on the shape-variable member 30, and a cover cap 36 having an air-flow hole 36a is disposed on the ring-shaped insulating member 34.

A current control member 38 may be further disposed between the cover cap 36 and the shape-variable plate 30. In a state where the shape-variable member 30 is insulated from the cover cap 36 by the insulating member 34, the current control member 38 is disposed inside the ring-shaped insulating member 34 between the shape-variable member 30 and the cover cap 36.

The current control member 38 is a primary safety device for cutting-off a flow of current by quickly generating resistance when a temperature of the battery is increased above an allowable level.

The current control member 38 is made of two metal layers, between which a mixture of carbon and polymer is disposed. When the temperature of the battery is increased above an allowable level, the polymer is thermally expanded to disconnect a polymer chain coupling, thereby cutting-off a flow of current. Preferably, the current control member 38 is designed to operate within a temperature of 75–85° C.

In addition, since the current control member 38 may be easily damaged by a low level of pressure, the current control member 38 should be designed such that it is not directly applied with a crimping force of the top end of the can 22.

Accordingly, in this embodiment, the thickness of the current control member 38 is designed to be less than that of the insulating member 34. At this point, a shock absorber 40 is disposed within a space between the current control member 38 and the cover cap 36 to absorb shock transmitted to the current control member 38.

It is preferable that the shock absorber 40 is provided in the form of a metal foam so that it can transmit electricity while absorbing shock. The metal foam is made of a material selected from Al or Ni.

Figure 3:
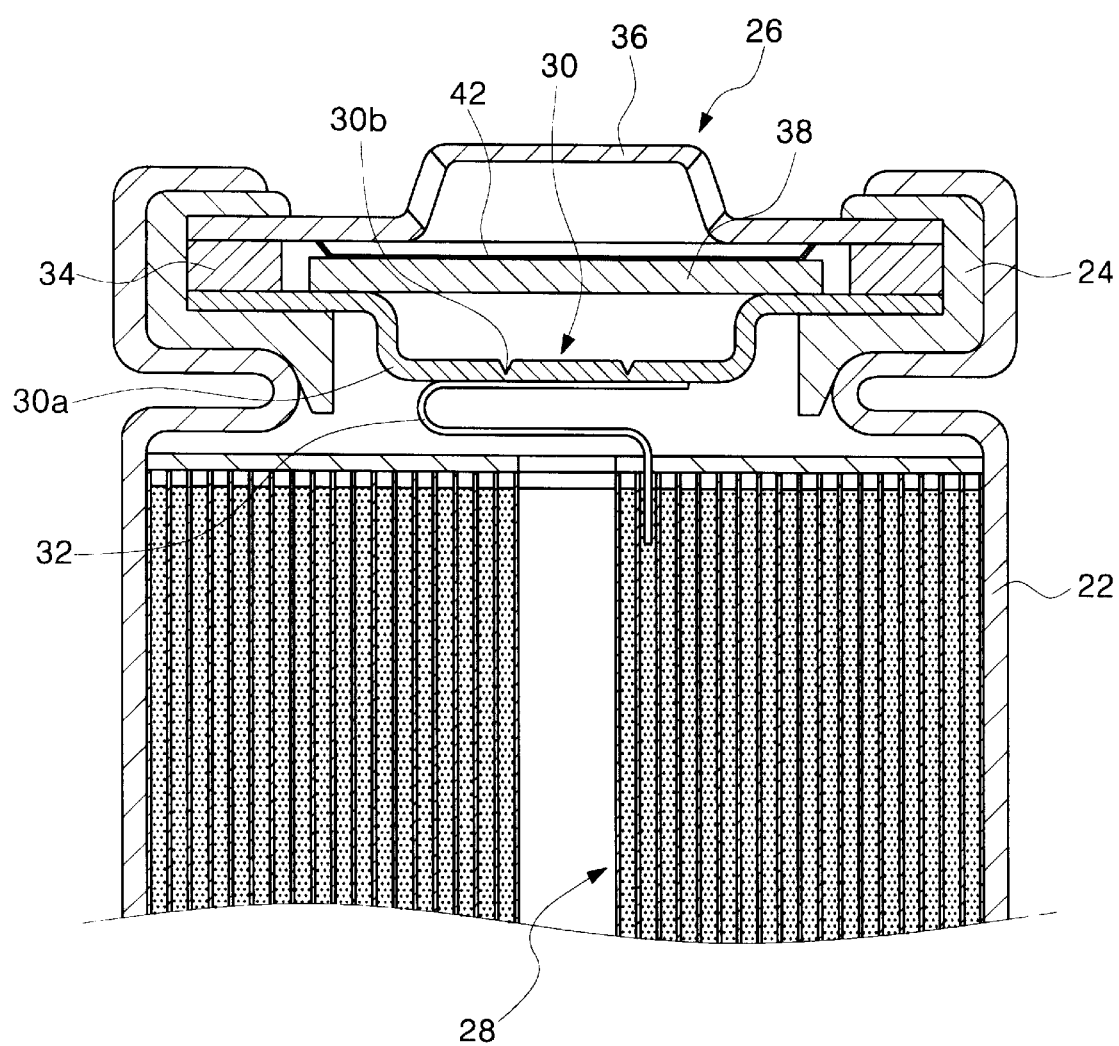
FIG. 3 is a sectional view of a sealed battery in which a modified example of a shock absorber is shown.

Alternatively, as shown in FIG. 3, the shock absorber may be provided in the form of an elastic member 42. The elastic member 42 may be a coil spring or a flat spring which is made of Al or Ni.

In addition, in the first embodiment, the current control member 38 is rectangular and disposed within an area defined by an inner circumference of the ring-shaped insulating member 34. Accordingly, the crimping force of the opened top of the can 22 is not directly applied to the current control member 38.

Figure 4:
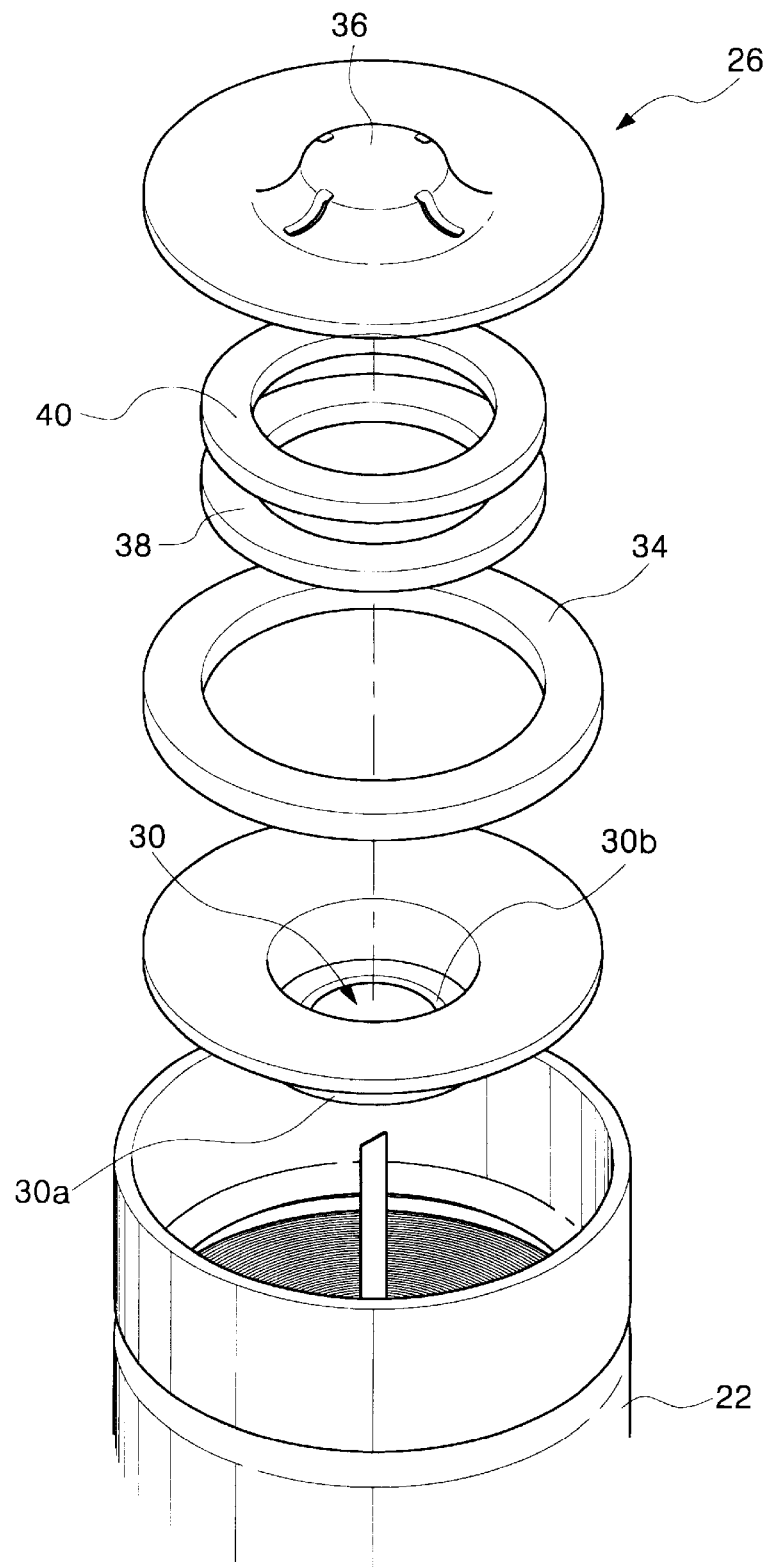
FIG. 4 is an exploded perspective view of a sealed battery in which a modified example of a current control member is shown.

As shown in FIG. 4, the current control member 38 may be formed in a ring-shape having an outer diameter less than an inner diameter of the insulating member 34, and the shock absorber 40 is designed having the same shape as the current control member 38.

Figure 5:
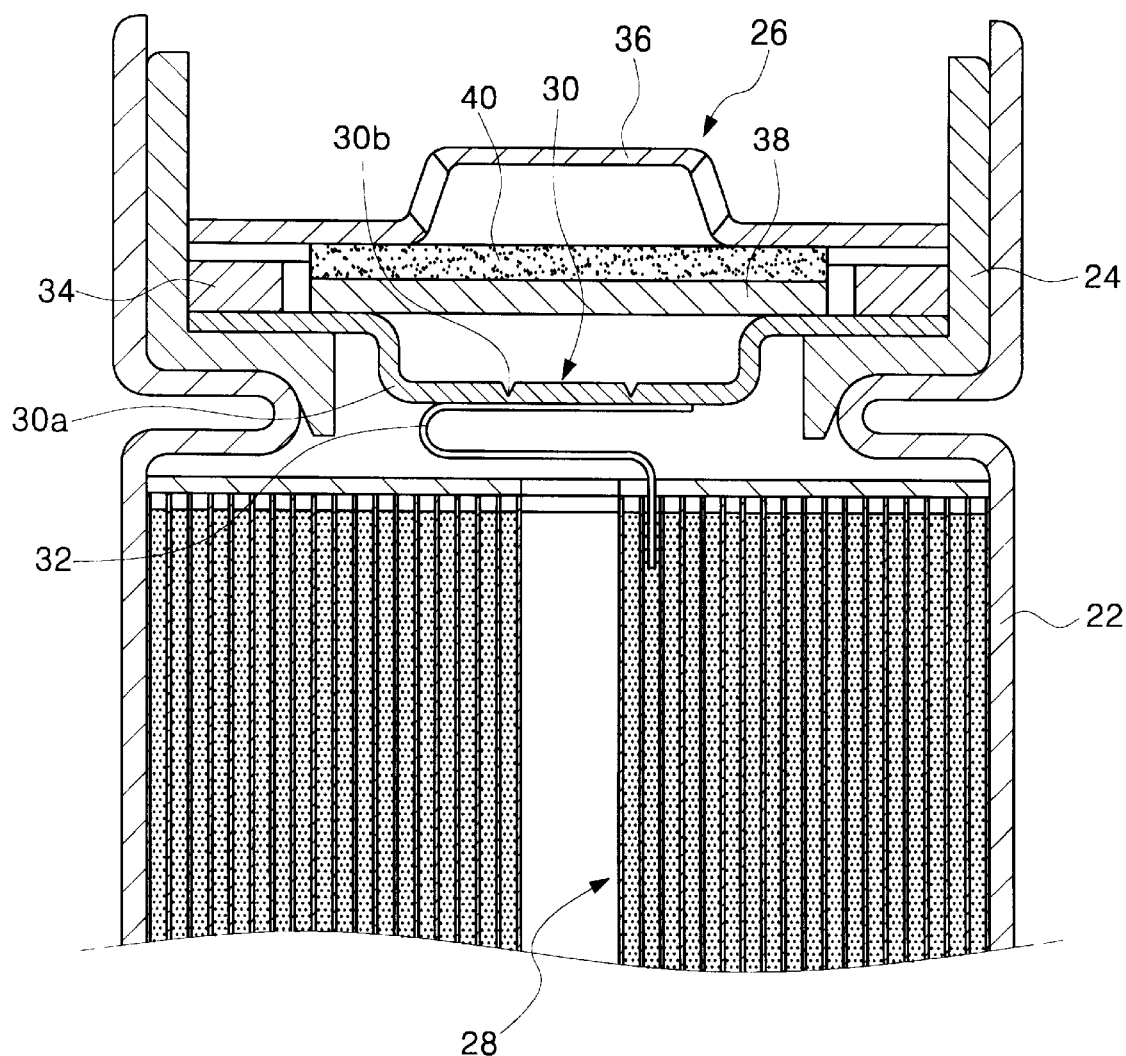
FIG. 5 is a sectional view of a sealed battery according to a first embodiment of the present invention before an opened top end of a cap is crimped.

An assembling method of the sealed battery of the present invention will be described with reference to FIG. 5.

A gasket 24 is first disposed on the opened top of the can 22, then the shape-variable member 30 and the insulating member 34 are disposed on the gasket 24. Next, the current control member 38 and the shock absorber 40 are disposed on the shape-variable member 30 inside the insulating member 34. Subsequently, the cover can 36 is disposed on the shock absorber 40, then finally the opened top of the can 22 is crimped, thereby completing the assembly of the battery.

Preferably, a total thickness of the current control member 38 and the shock absorber 40 is higher than the insulating member 34 such that when crimping the opened top of the can 22, the shock absorber 40 can be depressed by the crimping force. Accordingly, the shape-variable member 30 is electrically connected to the cover cap 36 while the current control member 38 is securely fixed without being applied to higher pressure.

In addition, the present invention provides secondary safety means that can prevent the battery from being exploded when internal pressure is increased above an allowable level even after the current control member 38 is operated.

As the secondary safety means, a safety groove 30b is formed on the projection 30a of the shape-variable member 30.

Figure 6:
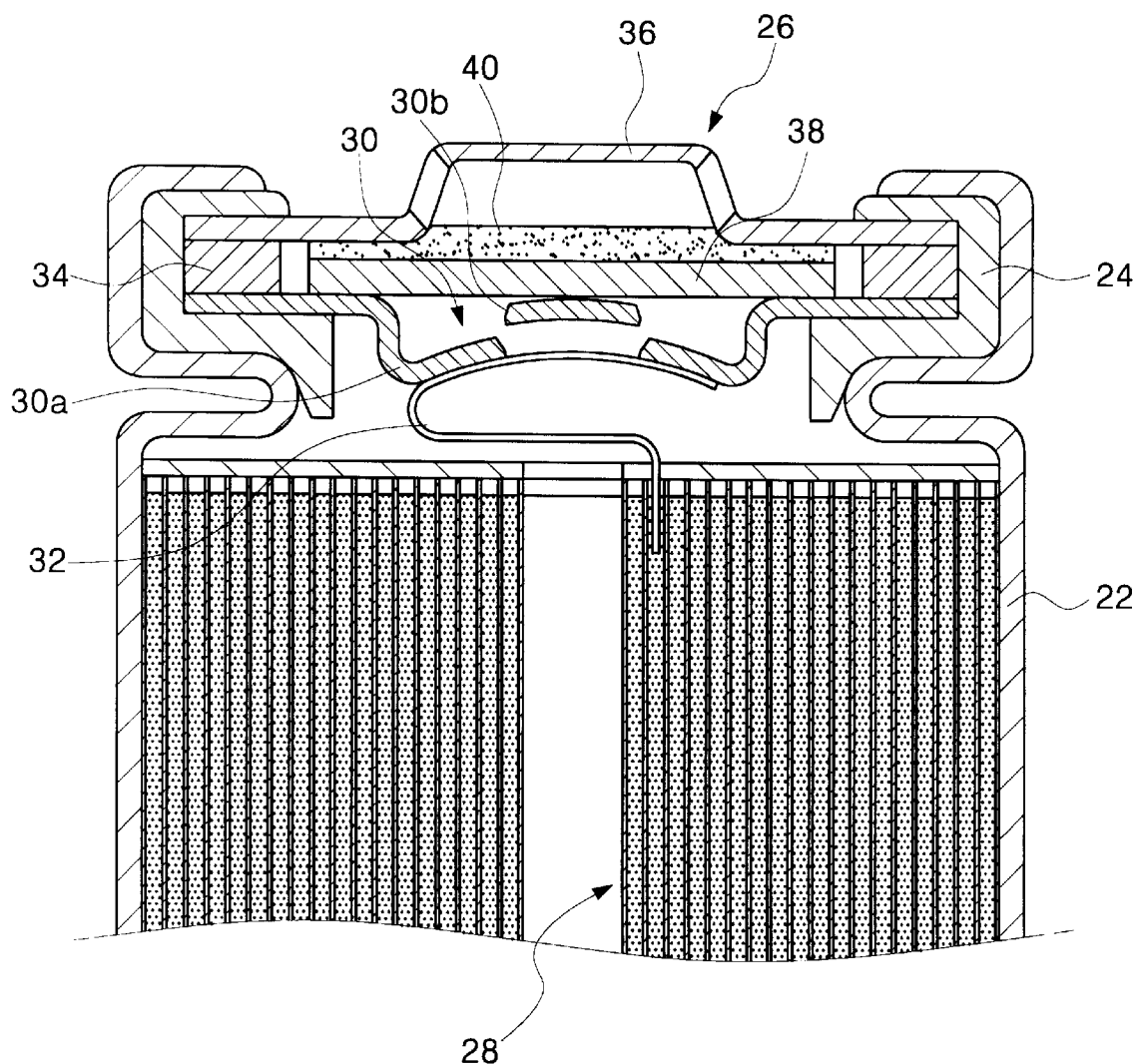
FIG. 6 is a sectional view illustrating an operational state of a sealed battery according to the present invention.

Accordingly, when the internal pressure is further increased above an allowable level even after the current control member 38 is operated, as shown in FIG. 6, the safety groove 30b is broken so that an internal gas can be exhausted, thereby preventing the battery from being exploded. Preferably, the safety groove 30b is designed such that it can be broken by a pressure of 12–16 kgf/cm$^2$.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A sealed battery comprising:

a can for receiving an electric generator;

a sealing member crimped on an opening of the can and connected to one of a positive electrode and a negative electrode of the electric generator, a gasket disposed between the can and the sealing member;

a cover cap disposed over the sealing member with an insulating member formed in a ring shape disposed between the cover cap and the sealing member, the cover cap is electrically connected to the sealing member;

a current control member disposed between the cover cap and the sealing member to cut-off a flow of current when a temperature of the battery is increased above an allowable level; a shock absorber formed out of metal disposed between the cover cap and the current control member to prevent shock from being directly transmitted to the current control member;

wherein the sealing member is a shape-variable plate having a projection on its center, and the sealing member is designed such that it breaks when internal pressure of the battery is increased above an allowable level to prevent explosion of the battery by exhausting an internal gas; and further wherein the sealing member is designed such that, upon breakage of the sealing member, at least a portion of the sealing member remains electrically connected to the positive or negative electrode of the generator.

2. A sealed battery of claim 1 wherein the sealing member is provided with a safety groove for providing a mechanically weak portion.

3. A sealed battery of claim 1 wherein the current control member is designed to be quickly increased in resistance within a temperature of 75–85° C.

4. A sealed battery of claim 1 wherein a thickness of the current control member is less than that of the insulating member.

5. A sealed battery of claim 1 wherein the insulating member is ring-shaped.

6. A sealed battery of claim 5 wherein the current control member is rectangular and disposed inside the ring-shaped insulating member.

7. A sealed battery of claim 5 wherein the current control member is ring-shaped and disposed inside the ring-shaped insulating member.

8. A sealed battery of claim 1 wherein the shock absorber is provided in the form of a metallic elastic member.

9. A sealed battery comprising:

a can for receiving an electric generator;

a sealing member crimped on an opening of the can and connected to one of a positive electrode and a negative electrode of the electric generator;

a gasket disposed between the can and the sealing member;

a cover cap disposed on the sealing member with an insulating member disposed between the cover cap and the sealing member;

a current control member disposed between the cover cap and the sealing member to cut-off a flow of current when a temperature of the battery is increased above an allowable level; and a shock absorber in the form of a metal foam disposed between the cover cap and the current control member to prevent shock from being directly transmitted to the current control member.

* * * * *